(12) United States Patent
Jennings

(10) Patent No.: US 8,327,934 B2
(45) Date of Patent: Dec. 11, 2012

(54) ACOUSTICALLY MEASURING ANNULUS PROBE DEPTH

(75) Inventor: Charles E. Jennings, Tomball, TX (US)

(73) Assignee: Vetco Gray Inc., Houston, TX (US)

( * ) Notice: Subject to any disclaimer, the term of this patent is extended or adjusted under 35 U.S.C. 154(b) by 348 days.

(21) Appl. No.: 12/830,159

(22) Filed: Jul. 2, 2010

(65) Prior Publication Data

US 2010/0314097 A1 Dec. 16, 2010

Related U.S. Application Data

(63) Continuation-in-part of application No. 12/167,979, filed on Jul. 3, 2008, now Pat. No. 7,762,327.

(51) Int. Cl.
*E21B 47/09* (2012.01)
*E21B 43/00* (2006.01)

(52) U.S. Cl. .................... 166/255.1; 166/64

(58) Field of Classification Search .............. 166/64, 166/65.1, 255.1, 255.2; 181/124; 367/27, 367/33
See application file for complete search history.

(56) References Cited

U.S. PATENT DOCUMENTS

| | | | |
|---|---|---|---|
| 4,079,315 A | 3/1978 | Mohr | |
| 4,938,060 A | 7/1990 | Sizer | |
| 5,458,198 A | 10/1995 | Hashemi | |
| 5,927,405 A | 7/1999 | Monjure | |
| 6,186,239 B1 | 2/2001 | Monjure | |
| 6,289,992 B1 | 9/2001 | Monjure | |
| 6,896,059 B2 * | 5/2005 | Brooks et al. | 166/297 |
| 7,044,227 B2 | 5/2006 | Jennings | |
| 7,069,995 B2 | 7/2006 | Chan | |
| 2003/0062155 A1 | 4/2003 | Summers | |
| 2003/0106693 A1 | 6/2003 | Jennings | |

FOREIGN PATENT DOCUMENTS

WO WO2006103464 A1 10/2006

OTHER PUBLICATIONS

International Search Report Dated Nov. 2, 2009, for related application PCT/US2009/048543.

* cited by examiner

*Primary Examiner* — Giovanna Wright
*Assistant Examiner* — Michael Wills, III
(74) *Attorney, Agent, or Firm* — Bracewell & Giuliani LLP

(57) ABSTRACT

A casing annulus is remediated by inserting a hose into a casing annulus, the hose having a nozzle on its lower end. An acoustic signal is directed into the annulus. A sensor in the hose receives the acoustic signal and transmits data from the sensor to the surface. The data represents the acoustic signal arrival time to the sensor, and an analyzer estimates the sensor depth based on the data. The hose is inserted from a reel into a wellhead above the annulus. An electrical transducer mechanically coupled to the hose creates the acoustic signal. The signal is propagated along the hose and transferred to the fluid in the annulus, where it then propagates further into the annulus. The transducer can be installed on a hose roller along which the hose is fed into the wellhead.

7 Claims, 3 Drawing Sheets

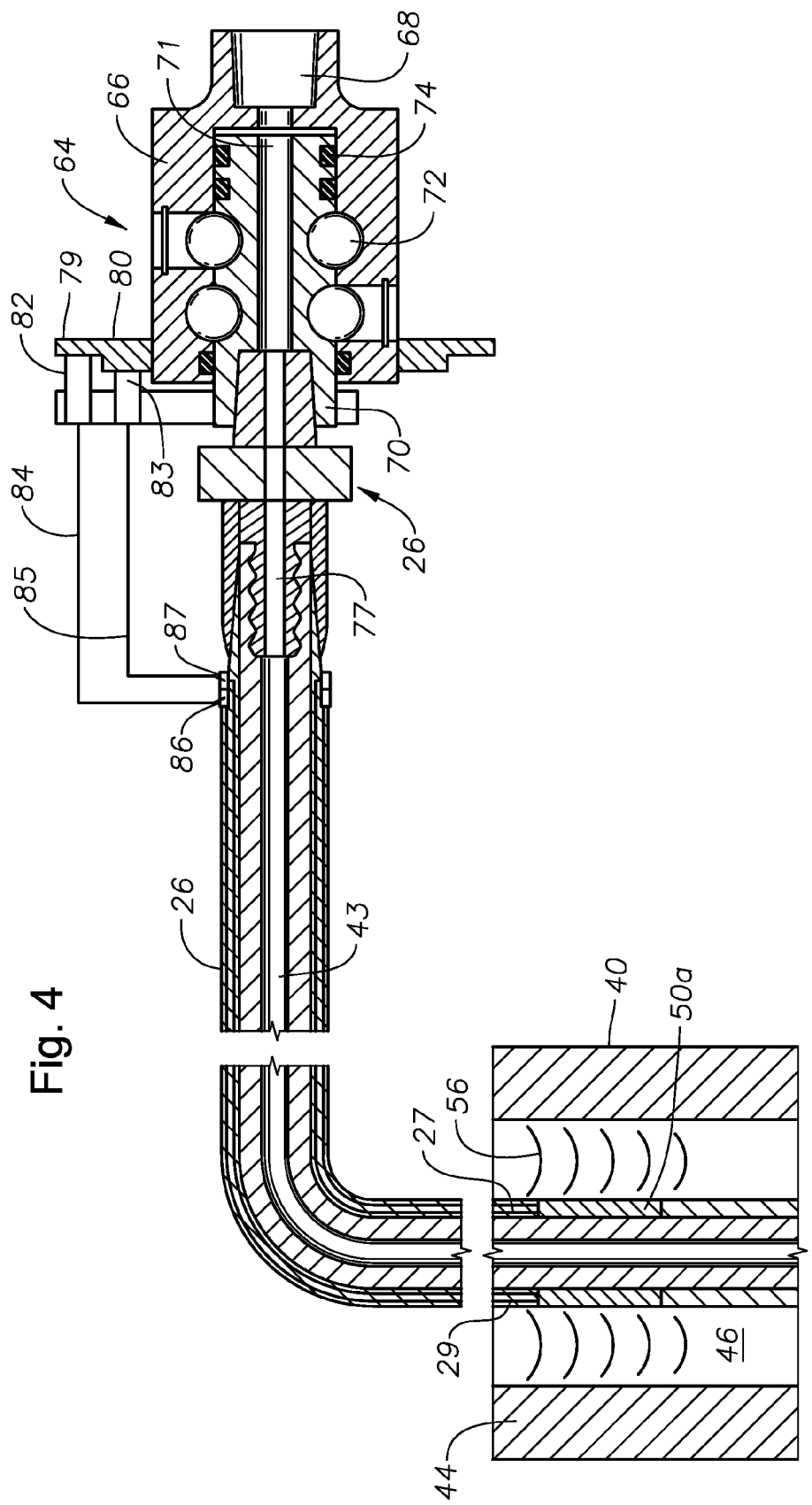

ACOUSTICALLY MEASURING ANNULUS PROBE DEPTH

CROSS REFERENCE TO RELATED APPLICATIONS

This application is a continuation-in-part of co-pending U.S. application Ser. No. 12/167,979 filed Jul. 3, 2008, the full disclosure of which is hereby incorporated by reference herein.

BACKGROUND

1. Field of Invention

The device described herein relates generally to the production of oil and gas. More specifically, the present disclosure relates to a system and method for acoustically measuring the nozzle depth of a casing annulus remediation system.

2. Description of Related Art

Hydrocarbon producing wellbores have casing lining the wellbore and production tubing suspended within the casing. Some wellbores may employ multiple well casings of different diameters concentrically arranged in the wellbore. In some instances, a casing string may develop a leak thereby pressurizing an annulus between the leaking casing string and adjacent casing. Other sources of leaks include tubing, packers, wellhead packoffs, and faulty casing cement bond.

Pressure in the annulus can be controlled by introducing a high specific gravity fluid into the annulus, thereby isolating the wellhead from the pressure. In addition to adding fluid directly to the top of the annulus through a wellhead, hydraulic hose systems have been used to inject fluid into the pressurized annulus. The hose generally includes a nozzle element lowered proximate to the annulus bottom where the fluid is discharged from the hose. Typically the hose is stored on a reel from which it is unrolled, and then inserted through an entry in the wellhead. Although the hose may be stiffened with internal pressure, it may still bend when forced through the labyrinth of turns encountered between the wellhead and annulus. Tight tolerances in the annulus may also contribute to hose bending. Thus the "effective" length of hose inserted may not correlate to the length of hose taken from the reel.

SUMMARY OF INVENTION

The method and device disclosed herein is useful for accurately determining a hose location used in conjunction with casing annulus remediation services. The system employs an acoustic wave generator that creates an acoustic signal within the annulus, and a sensor for receiving the acoustic signal. The casing annulus remediation system employs a hose having a discharge end. The sensor may be included with the hose. The discharge end is inserted through a port formed in a wellbore housing and further forced into a casing annulus beneath the wellbore housing. The sensor receives acoustic signals and transmits data to an associated analyzer representing the received acoustic signal and the time received. Thus knowing the time the signal was created, the median through which the acoustic signal propagates, and the time it was received by a sensor, the depth of the sensor when it received the signal can be determined. Moreover, since the distance between the sensor and the discharge end of the hose is a fixed distance, the hose depth can also be calculated based on the received time of the acoustic signal by the sensor.

Disclosed herein is a method of remediating a well, where the well includes a wellhead above a borehole on the well surface. At least one casing string extends from the wellhead into the borehole and an annulus, having fluid therein, is circumferentially adjacent the casing string. A port is also on the wellhead in fluid communication with the annulus. In one example the method comprises, inserting a hose into the annulus through the port to an elevation beneath the port. In one embodiment the hose has a selectively openable discharge nozzle and a sensor in data communication with the well surface. An acoustic signal is generated in the annulus and the acoustic signal is received by the sensor. Data is transmitted from the sensor to the surface, where the data is representative of the time the sensor received the acoustic signal. The sensor depth within the annulus is estimated based on the data transmitted to the surface. The method may further comprise comparing the estimated sensor depth with a predetermined sensor depth, and repeating steps of generating the signal, receiving the signal, and estimating the depth, until the predetermined sensor depth is at or lower than the estimated depth. Fluid may be selectively discharged from the hose nozzle when the nozzle is at a desired depth to remediate the casing annulus. The acoustic wave may be directed into the hose from outside of the wellhead, where the acoustic wave propagates along the hose. Once inside the annulus, the wave propagating along the hose can generate the acoustic signal within the annulus fluid.

Also disclosed herein is a casing annulus remediation system. In one embodiment the system includes, a hose having a first end insertable into a casing annulus and a second end adapted to be in fluid communication with remediation fluid. A selectively openable nozzle is affixed to the hose first end and an acoustic wave generator is also coupled to the hose, optionally proximate at the hose second end. An acoustic signal sensor may be mounted to the hose proximate to the hose first end. The system includes an analyzer in data communication with the sensor. A conductor is optionally included along the hose, coupled on one end to the acoustic signal sensor and on another end to the analyzer. The conductor can be any data signal conducting member, such as a wire, a fiber optic, or a braided wire formed within a wall of the hose. A hose insertion system may be coupled with the hose that includes a hose reel and hose rollers. Optionally, an acoustic wave generator is affixed on a hose roller. The remediation system may be included with a cased wellbore assembly.

BRIEF DESCRIPTION OF DRAWINGS

Some of the features and benefits of the present invention having been stated, others will become apparent as the description proceeds when taken in conjunction with the accompanying drawings, in which:

FIG. 4 is a side cross sectional view of an embodiment of a rotating hose coupling and hose for use with the casing annulus remediation system of FIG. 1.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The present invention will now be described more fully hereinafter with reference to the accompanying drawings in which embodiments of the invention are shown. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout.

Figure 1:
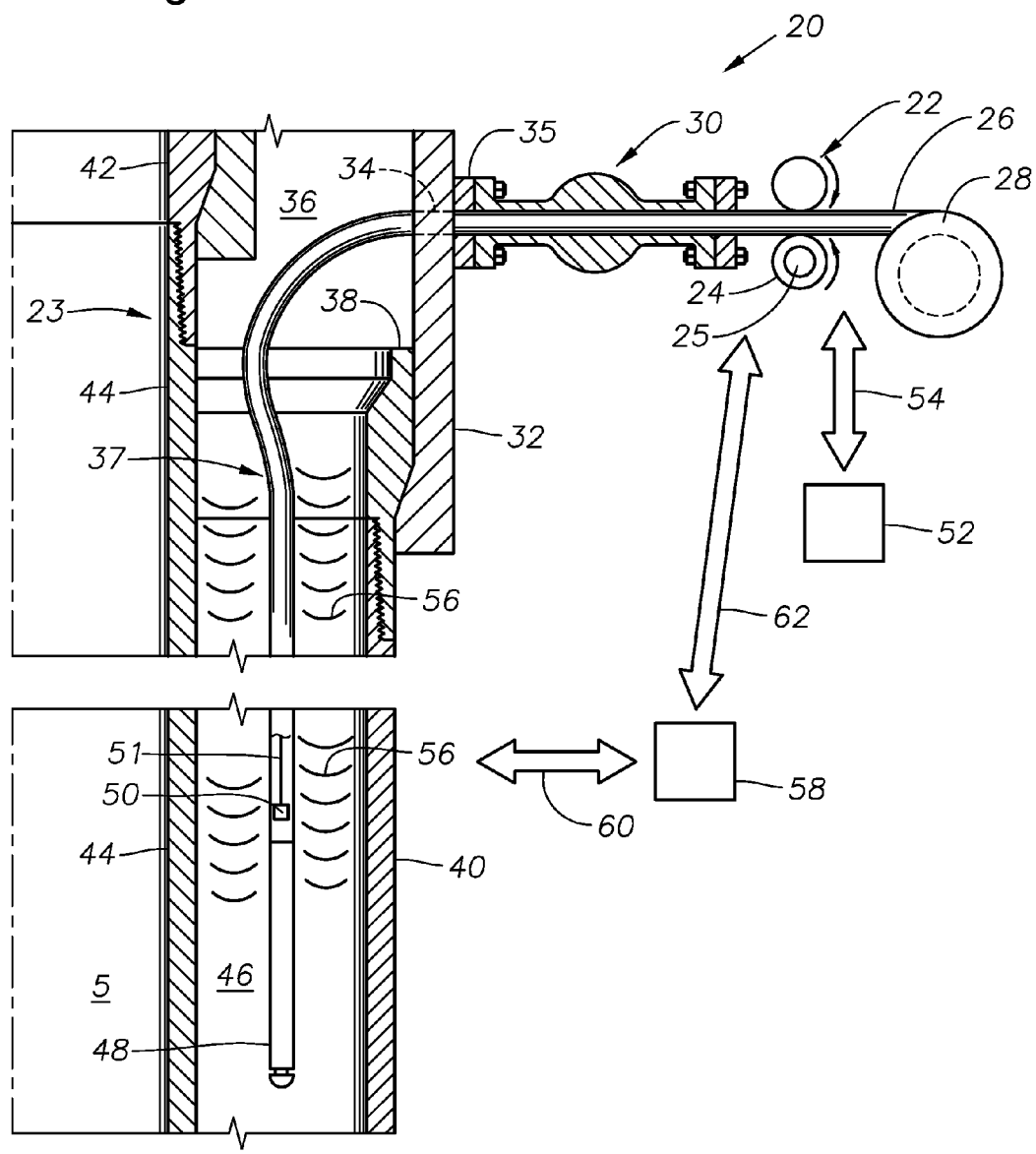
FIG. 1 is a side partial cross sectional view of a casing annulus remediation system having an acoustic depth indicator.

With reference now to FIG. 1, one example of a casing annulus remediation system 20 is shown in a side partial cross-sectional view coupled to a portion of a wellhead assembly 23. In the embodiment shown, the remediation system 20 includes a hose insertion system 22 having rotatable rollers 24 with a hose 26 passing between the rollers 24. A reserve length of hose 26 is illustrated coiled and stored on the hose reel 28. The hose 26 extends from the rollers 24 into a valve assembly 30 in a direction opposite the hose reel 28. The valve assembly 30 is flangedly connected to a flanged port 35 that is attached to a low pressure wellhead housing 32. The low pressure wellhead housing 32 comprises a portion of the wellhead assembly 23. The wellhead assembly 23 also includes an inner casing hanger 42 having casing 44 attached to its lower end. The low pressure wellhead housing. 32 circumscribes the inner casing hanger 42 and forms an annulus space 36 therebetween. A passage 34 shown in dashed outline is formed through the low pressure wellhead housing 32 and aligned with an opening in the flanged port 35.

The hose 26 is shown exiting the passage 34 and extending into the annular space 36. Also within the annulus 36 is a casing hanger 38 affixed to the low pressure wellhead housing 32 and having casing 40 extending from its lower end. The casing 40 and inner casing 44 extend downward past the wellhead housing 32 below surface and adjacent a wellbore 5. An annulus 46 resides in the space between the casing 40 and inner casing 44 and the region adjacent the wellbore 5. The lower or first end of the hose 26 is shown disposed within the annulus 46 and having an attached fluid nozzle assembly 48. The fluid nozzle assembly 48 is selectively operable to open and close to deliver remediation fluid from the hose 26 into the annulus 46 for the above described remediation operations.

Figure 2:
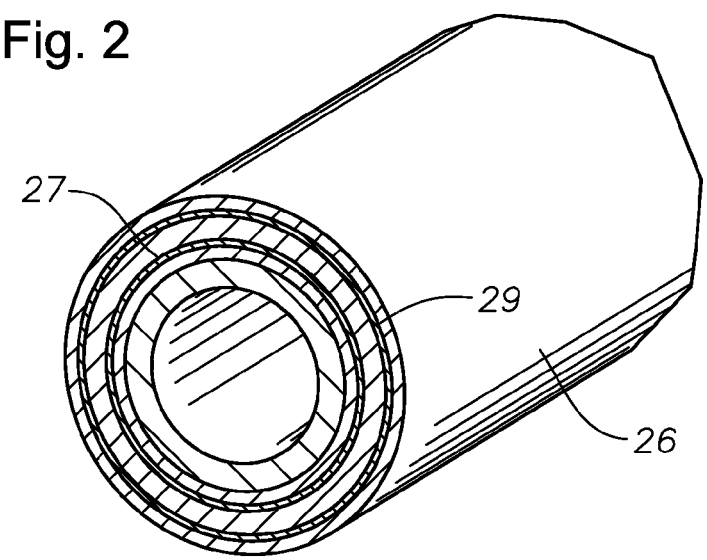
FIG. 2 is a perspective cutaway view of a portion of a hose used in the system of FIG. 1.

FIG. 2 is a perspective cutaway view of a portion of a hose 26 illustrating metal braids 27, 29 formed within the wall of the hose 26. The braids 27, 29 circumscribe the hose 26 axis and extend substantially along the length of the hose 26. In one example of use, the metal braids 27, 29 comprise a conductor from which sensor 50 can send data signals through the hose 26 for data analysis. The material of the braids 27, 29 is not limited to metal, but can be any material capable of transmitting data signals, such as electrically conductive polymers and fiber optics.

A sensor 50 is schematically illustrated in the hose 26 proximate to the lower end and above the fluid nozzle assembly 48. A connector 51 is schematically depicted connected to the sensor 50. The connector 51 is operable to convey data communication between the sensor 50 and the surface. The connector 51 may comprise a signal conducting member, such as a wire, with or inside the hose 26 or the metal braids 27, 29.

An acoustic transducer 52 is schematically illustrated operatively coupled to the hose 26 at the surface via a coupling 54. The transducer 52 may directly contact the hose 26 to impart vibrational energy into the hose 26. In this embodiment the coupling 54 comprises a mechanical means of communicating acoustically energy from the transducer 52 to the hose 26. Optionally, the transducer 52 may induce vibrations in the hose 26 through a pulsed electro-magnetic field. In this embodiment the coupling 54 comprises a fluctuating magnetic field. The acoustic transducer 52 produces vibrations in the hose 26 via the coupling 54. The vibrations in the hose 26 form acoustic waves propagating through the hose 26 to form an acoustic wave within the annular space 36; the acoustic wave then travels to within the annulus 46. Optionally, an acoustic transducer 25 may be included directly on one or both of the rollers 24 for transmitting an acoustic wave through the roller 24 and to the hose 26.

Figure 3:
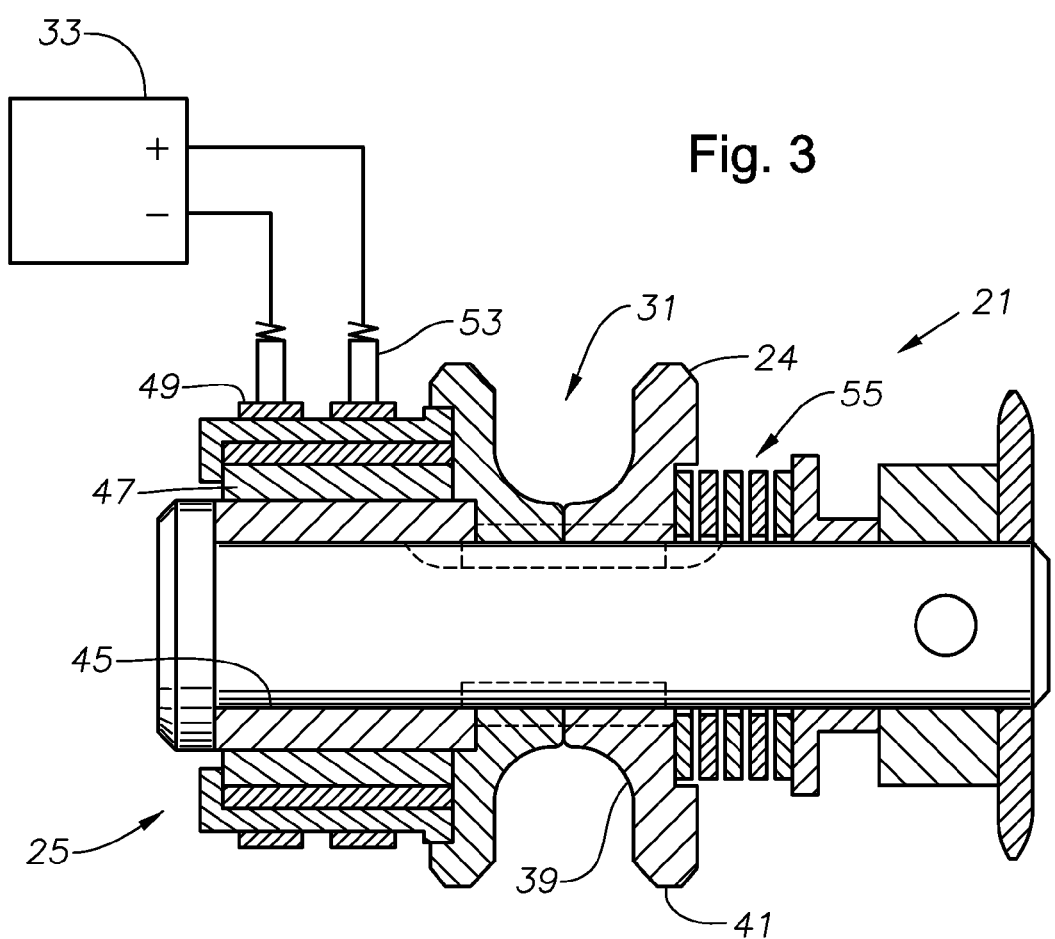
FIG. 3 is a side view of a drive roller having an acoustic transducer.

FIG. 3 illustrates a longitudinal view of an example of a roller assembly 21 that comprises a pair of rollers 24. The rollers 24 comprises a spool body 31 having a cylindrical base 39 with flange members 41 coaxially aligned with the base 39 on each of its ends. On one side of a flange member 41 is affixed an example of an acoustic transducer 25. A spring 55 is coaxially disposed adjacent a roller 24, as discussed in more detail below, the spring 55 comprises a compressive force to the rollers 24 to better engage the hose 26 as it passes between the rollers 24. The acoustic transducer 25 is connected to a power source 33 for providing power to operate the acoustic transducer 25. In the example shown, the transducer 25 includes a piezoelectric sleeve 45 that converts electrical energy from the power source 33 into mechanical vibrations. Terfenol™ is one example of the sleeve 45 material. Also shown is a coil 47 circumscribing the sleeve 45, the coil 47, which may be comprised of a copper winding, is in electrical communication with slip rings 49. The slip rings 49 are cylindrical bands disposed around the coil 47 that are rotatable with the coil 47. Brushes 53 connected to the power source 33 contact the slip ring 49 outer circumference, thereby providing an electrical path between the power source 33 and coil 47 for exciting the sleeve 45.

FIG. 4 illustrates one example of a rotary coupling assembly 64 on the upper or second end of the hose 26, and an embedded sensor 50a on the first or lower end of the hose 26. The hose 26 lower end is shown disposed within the annulus 46. The coupling assembly 64 comprises a cylindrical annular housing 66 open on one end and hollowed out to receive a cylindrical spindle 70 therein. A series of bearings 72 circumscribe the spindle 70 and fit into corresponding hemispherical recesses formed on the inner surface of the housing 66 and the outer surface of the spindle 70. Seals 74 are also provided in annular recesses along the outer surface of the spindle 70. A fluid inlet 68 is formed into the housing 66 on the end opposite its opening. A passage 71 is formed along the axis of the spindle 70 extending therethrough. The spindle 70 includes an axial bore on its end that extends out from the housing 66. The bore is formed to receive a hose nipple 76 therein and is coaxially aligned with the passage 71. The hose nipple 76 includes a passage 77 formed along its axis and aligned with the passage 71 in the spindle 70. The hose nipple 76 has a male end contoured on its outer surface to mate with a female portion of the hose 26 having corresponding contours on its inner surface. The passage 77 within the hose nipple 76 is similarly aligned with a fluid passage 43 formed along the hose 26 axis. A fluid supply system (not shown) provides pressurized remediation fluid to the rotary coupling assembly 64 via the inlet 68. The aligned passages 71, 77, 43 therefore provide fluid communication from the fluid supply system into the hose 26. Moreover, the rotating spindle 70 enables the hose 26 to be placed on the reel 28 without tangling the hose 26 while rotating the reel 28.

The end of the hose 26 disposed within the annulus 46 includes an embodiment of the sensor 50a embedded within the hose 26 wall and shown electrically connected to the wire braids 27, 29. The wire braids 27, 29 extend through the hose 26 wall to the surface and into electrical communication with slip rings 79, 80 provided on the rotary coupling assembly 64. Corresponding electrical brushes 82, 83 are shown providing electrical communication between the slip rings 79, 80 and the wire braids 27, 29 via the lines 84, 85 and rings 86, 87, where the rings 86, 87 connect respectively to braids 29, 27. The brushes 82, 83 are further in electrical or data communication with the analyzer 58, therefore providing an electrical communication loop between the sensor 50a and the data analyzer 58.

In one example of use, an acoustic wave is generated within the hose 26 above the surface and outside of the wellhead assembly 23. The vibrational acoustic wave then travels along the hose 26, through the valve assembly 30 and wellhead assembly 23, and into the annular space 36. Once inside the annular space 36, the hose vibration creates a corresponding acoustic signal, illustrated by curved lines 56, within the fluid residing in the annular space 36. The fluid can be a liquid that has leaked within the casing annulus, or it can be a gas from within the wellbore, or ambient air. Continued propagation of the acoustic waves 56 continues into the annulus 46 where it can be received by the sensor 50. The sensor 50, which can be a piezoelectric device, senses the acoustic wave 56 and transmits data to an associated analyzer, such as via the illustrative coupling 60 to the analyzer 58. Optionally, the data signal can travel through the connector 51, back up the hose 26, where it is received on surface and then transferred to the analyzer 58 via the coupling 62. The coupling 62 comprises any means of transmitting communication from the connector 51 to the analyzer 58. The coupling 62 may comprise the rotary coupling assembly 64, it can be wireless telemetry, a direct connection between the connector 51 and the analyzer 58, or any other manner of transferring data from the connector 51 to the analyzer 58.

The analyzer 58 may include an analog to digital converter as well as digital signal processing. The analyzer 58 is configured to receive the signal data through the coupling 62 and determine the time of travel of the acoustic signal through the annular space 36 and annulus 46. Using a calculated acoustic signal travel time, the analyzer 58 can also determine a depth of the sensor 50 when it received the acoustic signal. An accurate estimate of the sensor 50 depth can in turn provide a means for determining an accurate depth of the fluid nozzle assembly 48.

In one mode of operation, the acoustically measured depth of either the sensor 50 or the fluid nozzle assembly 48 is compared to a desired depth. In one example, a desired depth is a depth at which the fluid nozzle assembly 48 can be activated to allow fluid through the hose 26 to fill the annulus 46 for remediation or other wellbore service operations. It is well within the capabilities of those skilled in the art to adequately determine a desired depth. If, on the other hand, it is determined the sensor 50 and/or fluid nozzle assembly 48 is above the desired depth, the acoustic sequence of sending acoustic signals and processing the received acoustic data can be repeated while continuously urging the hose 26 deeper within the annulus 46. When recorded data indicates the sensor 50 or fluid nozzle assembly 48 is at or below the desired depth, the fluid nozzle assembly 48 can be selectively opened for remediation operations.

It is to be understood that the invention is not limited to the exact details of construction, operation, exact materials, or embodiments shown and described, as modifications and equivalents will be apparent to one skilled in the art. In the drawings and specification, there have been disclosed illustrative embodiments of the invention and, although specific terms are employed, they are used in a generic and descriptive sense only and not for the purpose of limitation. Accordingly, the invention is therefore to be limited only by the scope of the appended claims.

What is claimed is:

1. A casing annulus remediation system comprising:
a hose;
a spindle housing;
an annular spindle coaxially coupled to an end of the hose and rotatably disposed within the spindle housing;
a selectively openable nozzle affixed to an end of the hose distal from the annular spindle;
a spool assembly engaging the hose that comprises coaxially disposed rollers each having an annular base and a flange projecting radially outward from a portion of each base to define a groove between the flanges and circumscribing a portion of each base and a selectively energizable piezoelectric member in contact with one of the rollers for inducing an acoustic signal in the hose;
an acoustic signal sensor with the hose proximate the nozzle; and
an analyzer for receiving signal data from the signal sensor and estimating a distance from the spool assembly to the nozzle.

2. The casing annulus remediation system of claim 1 further comprising a conductor extending along the hose, coupled on one end to the acoustic signal sensor and on another end to the analyzer.

3. The casing annulus remediation system of claim 2, wherein the conductor comprises a braided wire formed within a wall of the hose.

4. The casing annulus remediation system of claim 1, wherein the acoustic wave generator is affixed on a hose roller.

5. The casing annulus remediation system of claim 1, wherein the analyzer is located adjacent the nozzle.

6. The casing annulus remediation system of claim 1, wherein the end of the hose having the nozzle is insertable into an annulus in a wellbore assembly.

7. The casing annulus remediation system of claim 1, further comprising an opening on an end of the spindle housing connectable to a source of remediation fluid.

* * * * *